United States Patent
Salenbien et al.

(10) Patent No.: US 10,344,796 B2
(45) Date of Patent: Jul. 9, 2019

(54) RETENTION MECHANISM FOR A FORWARD FOLDING SEAT ASSEMBLY

(71) Applicant: Ford Global Technologies, LLC, Dearborn, MI (US)

(72) Inventors: Nicholas Salenbien, Dundee, MI (US); Kevin Mozurkewich, Livonia, MI (US); Ammeswara Rao Sajja, Canton, MI (US); Chih-Cheng Liao, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 151 days.

(21) Appl. No.: 15/461,987

(22) Filed: Mar. 17, 2017

(65) Prior Publication Data
US 2018/0264978 A1 Sep. 20, 2018

(51) Int. Cl.
*F16C 11/10* (2006.01)
*B60N 2/36* (2006.01)

(52) U.S. Cl.
CPC .............. *F16C 11/10* (2013.01); *B60N 2/366* (2013.01)

(58) Field of Classification Search
CPC ...... B60N 2/3013; B60N 2/305; B60N 2/682; B60N 2/309; B60N 2/3088; B60R 7/043; F16C 11/10
See application file for complete search history.

(56) References Cited

U.S. PATENT DOCUMENTS

| | | | | | |
|---|---|---|---|---|---|
| 4,124,250 | A | * | 11/1978 | Weinich | B60N 2/3013 296/66 |
| 4,290,647 | A | * | 9/1981 | Hensel | B60N 2/20 297/354.1 |
| 4,475,763 | A | * | 10/1984 | Hamatani | B60N 2/3013 296/65.09 |
| 4,475,769 | A | * | 10/1984 | Crawford | B60N 2/3011 297/331 |
| 4,512,609 | A | * | 4/1985 | Parsson | B60N 2/3013 296/65.09 |
| 4,636,003 | A | * | 1/1987 | Siebler | B60N 2/3011 297/336 |
| 4,637,653 | A | * | 1/1987 | Yoshida | B60N 2/305 296/65.05 |
| 4,954,008 | A | * | 9/1990 | Dicke | F16C 11/10 403/24 |
| 5,044,683 | A | * | 9/1991 | Parsson | B60N 2/3013 280/807 |
| 5,240,302 | A | * | 8/1993 | Yoshida | B60N 2/3011 296/65.09 |

(Continued)

*Primary Examiner* — James M Ference
(74) *Attorney, Agent, or Firm* — Vichit Chea; Price Heneveld LLP

(57) ABSTRACT

A hinge assembly for a folding vehicle seat includes upper and lower arms pivotally coupled to one another between open and closed positions. The lower arm is fixedly coupled to a support surface, such as a vehicle body, and the upper arm is fixedly coupled to a lower surface of a seat pan. A retaining bar is disposed on the lower arm and outwardly extends therefrom. An outwardly opening clip member is disposed on the upper arm. The clip member releasably receives the retaining bar of the lower arm when the upper and lower arms are in the closed position to retain the vehicle seat in a folded down use position.

16 Claims, 12 Drawing Sheets

(56) References Cited

U.S. PATENT DOCUMENTS

| | | | | |
|---|---|---|---|---|
| 5,372,398 A * | 12/1994 | Aneiros | B60N 2/01583 | 248/430 |
| 5,482,349 A * | 1/1996 | Richter | B60N 2/2352 | 296/65.09 |
| 5,547,242 A * | 8/1996 | Dukatz | B60N 2/01583 | 116/283 |
| 5,558,386 A * | 9/1996 | Tilly | B60N 2/305 | 292/111 |
| 5,603,550 A * | 2/1997 | Holdampf | B60N 2/3013 | 297/14 |
| 5,662,368 A * | 9/1997 | Ito | B60N 2/01583 | 296/65.05 |
| 5,662,377 A * | 9/1997 | Holdampf | B60N 2/3013 | 297/14 |
| 5,681,081 A * | 10/1997 | Lindner | B60N 2/3011 | 297/216.13 |
| 5,795,023 A * | 8/1998 | Kayumi | B60N 2/3013 | 297/331 |
| 5,954,398 A * | 9/1999 | Namba | B60N 2/3013 | 297/257 |
| 5,957,522 A * | 9/1999 | Matsuhashi | B60N 2/3013 | 296/65.09 |
| 5,975,611 A * | 11/1999 | Hoshihara | B60N 2/01583 | 248/503.1 |
| 6,000,742 A * | 12/1999 | Schaefer | B60N 2/3011 | 296/65.09 |
| 6,030,038 A * | 2/2000 | Namba | B60N 2/3013 | 297/257 |
| 6,070,939 A * | 6/2000 | Matsuo | B60N 2/3013 | 296/68.1 |
| 6,079,763 A * | 6/2000 | Clemente | B60N 2/3011 | 248/430 |
| 6,155,639 A * | 12/2000 | Frolo | B60N 2/305 | 296/65.03 |
| 6,158,799 A * | 12/2000 | Guilford | B60N 2/01583 | 296/65.01 |
| 6,361,098 B1 * | 3/2002 | Pesta | B60N 2/01583 | 248/503.1 |
| 6,371,559 B1 * | 4/2002 | Kienzle | B60N 2/3013 | 297/403 |
| 6,375,245 B1 * | 4/2002 | Seibold | B60N 2/01583 | 248/503.1 |
| 6,499,787 B2 * | 12/2002 | Jach | B60N 2/045 | 296/65.01 |
| 6,568,736 B2 | 5/2003 | Jach et al. | | |
| 6,705,658 B2 | 3/2004 | Jach et al. | | |
| 6,736,456 B2 * | 5/2004 | Okamoto | B60N 2/2809 | 297/254 |
| 6,805,407 B2 * | 10/2004 | Iliscu | B60N 2/305 | 296/65.03 |
| 6,817,646 B2 * | 11/2004 | Kikuchi | B60N 2/01583 | 296/65.05 |
| 7,618,094 B2 * | 11/2009 | DeLellis | B60N 2/1615 | 297/13 |
| 9,108,544 B2 * | 8/2015 | Ogata | B60N 2/3013 | |
| 9,758,070 B1 * | 9/2017 | Salenbien | B60N 2/305 | |
| 2003/0071492 A1 * | 4/2003 | Watanabe | B60N 2/206 | 297/15 |
| 2004/0150243 A1 * | 8/2004 | Epaud | B60N 2/3013 | 296/65.09 |
| 2005/0236879 A1 * | 10/2005 | Kim | B60N 2/3065 | 297/331 |
| 2005/0285424 A1 * | 12/2005 | Yokoyama | B60N 2/01516 | 296/37.14 |
| 2014/0049083 A1 * | 2/2014 | Watanabe | B60N 2/3013 | 297/331 |
| 2014/0062158 A1 * | 3/2014 | Line | B60N 2/2356 | 297/378.1 |
| 2016/0193949 A1 * | 7/2016 | Pywell | B60R 7/043 | 297/188.1 |
| 2016/0362920 A1 * | 12/2016 | Dey | E05D 11/1014 | |
| 2016/0362921 A1 * | 12/2016 | Dey | E05D 11/1014 | |

* cited by examiner

US 10,344,796 B2

RETENTION MECHANISM FOR A FORWARD FOLDING SEAT ASSEMBLY

FIELD OF THE INVENTION

The present invention generally relates to a retention mechanism, and more particularly, to a retention mechanism as incorporated into a folding seat assembly to retain a folding seat assembly in a downwardly folded use position when unoccupied.

BACKGROUND OF THE INVENTION

A number of vehicles today provide a flip forward second row seat architecture that allows a user to flip the seat portion of a second row seating assembly using a vehicle-forward rotation to provide improved cargo space, and also to provide room to allow a seatback assembly to rotate forward, thereby providing access to a trunk or cargo space. Some configurations rely on an interference between cushion materials of the seat portion and seatback at the bite line therebetween to retain the seat portion in the downward use position during an impact event. Such interference may be insufficient for properly retaining an unoccupied seat portion in a downwardly folded use position. Other retaining concepts include an inertia latch that is added to a rear riser assembly of a seat structure that selectively engages during a front impact event. This solution requires the addition of a mechanism and increased cost and weight of the overall system. Thus, a need exists to create a more lightweight, cost effective, and integrated solution to retain a seat portion in a downwardly folded use position when unoccupied during an impact event or other event which may urge a folding seat assembly toward an upright stowed position.

SUMMARY OF THE INVENTION

One aspect of the present invention includes a hinge assembly having first and second arms hingedly coupled to one another between open and closed positions. An engagement feature is disposed on the first arm and outwardly extends therefrom. An engagement feature is also disposed on the second arm. The engagement feature of the first arm is received and releasably retained in the engagement feature of the second arm when the first and second arms are in the closed position.
   first and second arms hingedly coupled to one another and operable between open and closed positions;
   an engagement feature disposed on the first arm; and
   an engagement feature disposed on the second arm configured to releasably retain the engagement feature of the first arm when the first and second arms are in the closed position.

Another aspect of the present invention includes a hinge assembly having a first arm with a retaining bar. A second arm is coupled to the first arm and operable between open and closed positions relative to the first arm. A clip member is coupled to the second arm for movement therewith. The clip member moves towards and releasably receives the retaining bar of the first arm as the second arm moves to the closed position from the open position.

Yet, another aspect of the present invention includes a hinge assembly for a folding vehicle seat having upper and lower arms pivotally coupled to one another between open and closed positions, wherein the lower arm is fixedly coupled to a base member, and further wherein the upper arm is fixedly coupled to a seat pan. A retaining bar is disposed on the lower arm and outwardly extends therefrom. An outwardly opening clip member is disposed on the upper arm. The clip member releasably receives the retaining bar of the lower arm when the upper and lower arms are in the closed position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1A:
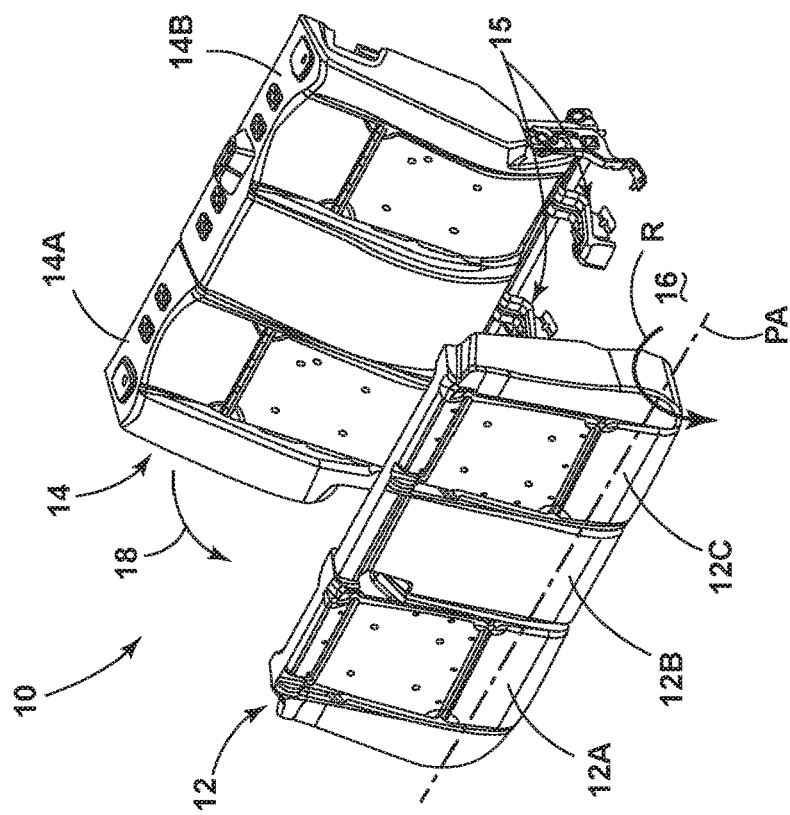
FIG. 1A is a front perspective view of a folding seat assembly.

For purposes of description herein, the terms "upper," "lower," "right," "left," "rear," "front," "vertical," "horizontal," and derivatives thereof shall relate to the invention as oriented in FIG. 1A. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1A, a folding seat assembly 10 is shown and contemplated for use as a second or third row passenger option within a vehicle. The folding seat assembly 10 includes a seat portion 12 and a seatback 14. The seat portion 12 is shown in FIG. 1A as having three sections 12A, 12B and 12C. It is contemplated that that seat portion 12 may rotate forward along the path as indicated by arrow R along a pivot access PA identified in FIG. 1A using a dashed line. The sections 12A-12C of the seat portion 12 may rotate individually or together. It is contemplated that the embodiment shown in FIG. 1A would include individual rotation of section 12A while sections 12B and 12C of the seat portion 12 would rotate together as a combined assembly. Any manner of rotation of the sections 12A-12C of the seat portion 12 are contemplated for use with the present invention. Similarly, the seatback 14 includes sections 14A, 14B which may fold downward to a stowed position when the seat portion 12 is rotated upward, thereby providing access to a trunk or cargo space of a vehicle. In the embodiment shown in FIG. 1A, the seat portion 12 and the seatback 14 are shown in use positions, wherein the seat portion 12 is in a generally horizontal use position and the seatback 14 is shown in a generally upright or semi-reclined use position. In this way, the folding seat assembly 10 of FIG. 1A is positioned to support one or more vehicle occupants with the seat portion 12 and seatback 14 in the use positions. Both the seat portion 12 and seatback 14 are pivotally coupled to a support surface 16 which is contemplated to be part of a vehicle body.

Figure 1B:
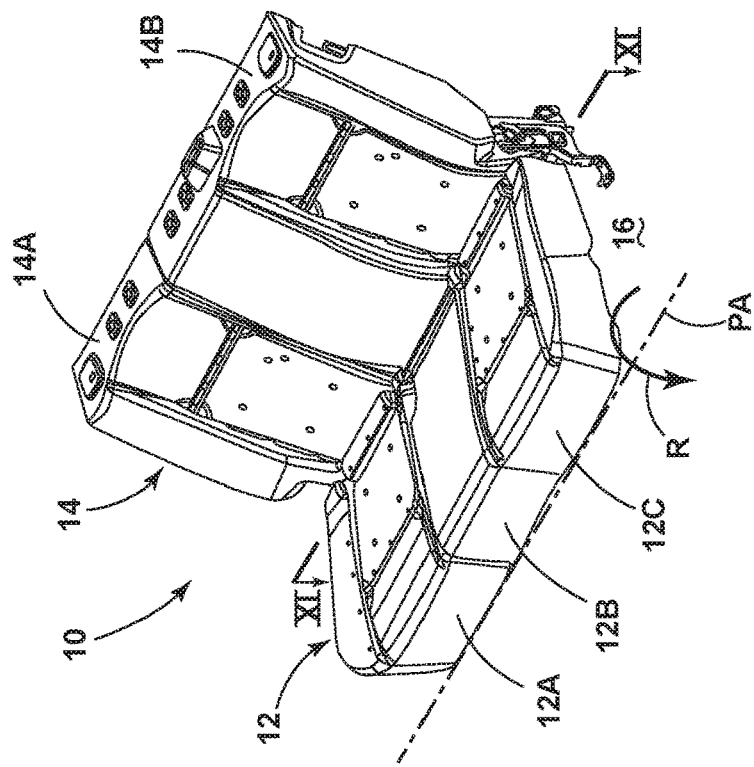
FIG. 1B is a front perspective view of the folding seat assembly of FIG. 1A with a seat portion in a forwardly folded upright stowed position.

Referring now to FIG. 1B, the seat portion 12 is shown having been rotated from the downward use position shown in FIG. 1A, to an upright forwardly folded stowed position. Thus, the seat portion 12 is operable between the use position (FIG. 1A) and the stowed position (FIG. 1B) as a seat portion 12 rotates along the pivot access PA along the path as indicated by arrow R. With the seat portion 12 in the upright stowed position, the sections 14A, 14B of the seatback 14 can rotate forward in a direction as indicated by arrow 18 to provide for an enhanced cargo option for a vehicle. The seatback 14 is secured to the support surface 16 by a plurality of brackets 15 from which the seatback 14 pivots. With the folding seat assembly 10 having a rotating seat portion 12, it is important that the sections 12A-12C of the seat portion 12 are easily moved from the use position (FIG. 1A) to the upright stowed position (FIG. 1B) for convenience of the user. However, it is also necessary to properly retain the seat portion 12 in the use position during an impact event, wherein forces may act on the seat portion 12 to move the seat portion 12 from the use position towards the stowed position. Thus, the seat portion 12 shown in FIGS. 1A and 1B provides for enhanced retaining of the seat portion 12 in the use position to avoid unwanted release or movement of the seat portion 12 when the seat portion 12 is unoccupied.

Figure 1C:
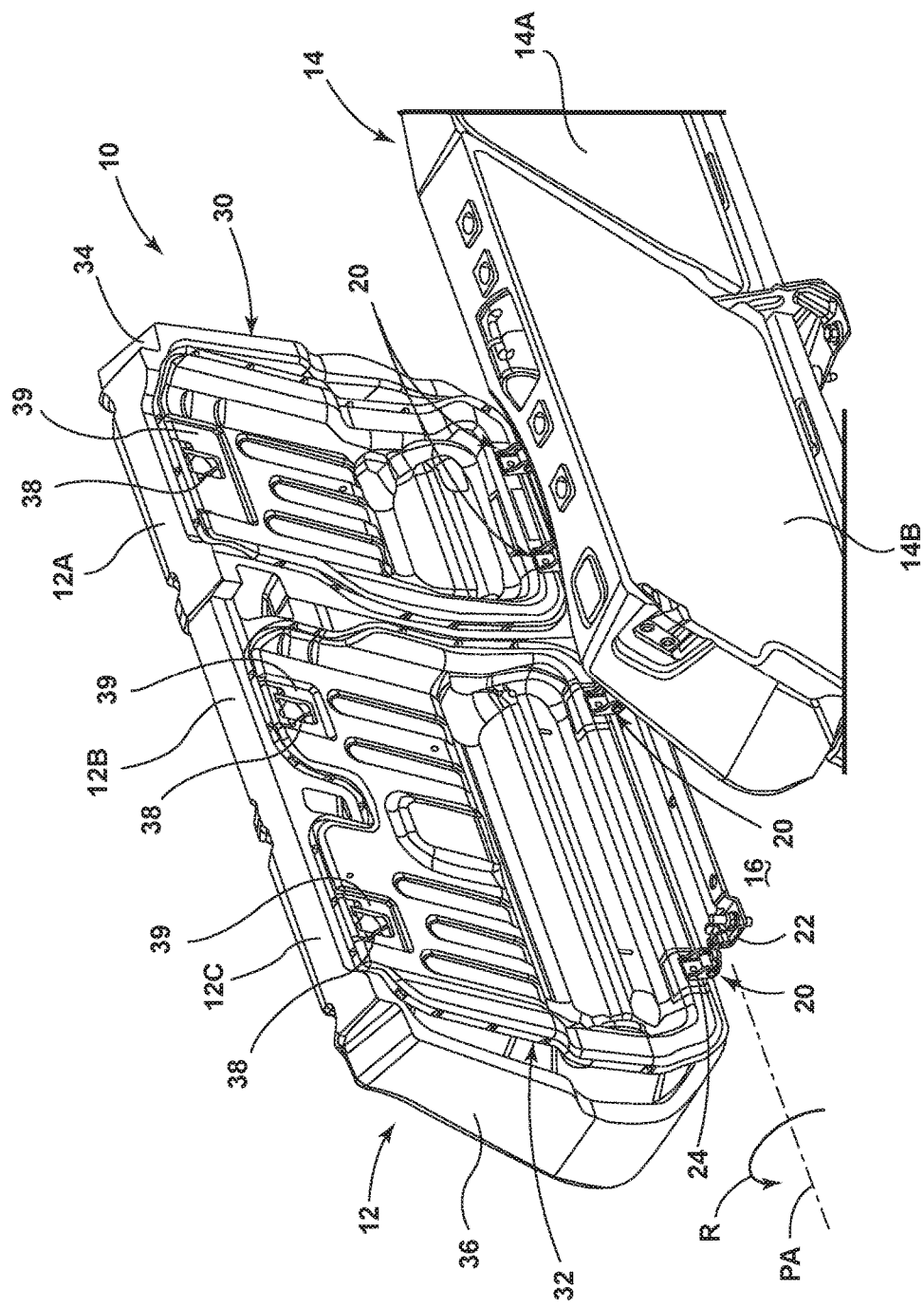
FIG. 1C is a rear perspective view of the folding seat assembly of FIG. 1B.

Referring now to FIG. 1C, the folding seat assembly 10 is shown with the seat portion 12 in the upright stowed position. The seat portion 12 is coupled to the support surface 16 via a plurality of hinge assemblies 20. The hinge assemblies 20 provide for hinged movement of the seat portion 12 in the direction as indicated by arrow R along the pivot access PA. This hinged movement is generally due to a first arm 22 being hingedly coupled to a second arm 24, wherein the first arm 22 is further coupled to support surface 16, while the second arm 24 is operably coupled to the seat portion 12. The first and second arms 22, 24 of the hinge assemblies 20 are further described below. As shown in FIG. 1C, the seat portion 12 includes two seat pans 30, 32, wherein seat pan 30 support sections 12A of the seat portion 12 and seat pan 32 supports sections 12B and 12C of the seat portion 12. The seat pans 30, 32 are coupled to cushion members 34, 36, respectively, along an upper surface of the seat pans 30, 32. The second arms 24 of the hinge assemblies 20 are shown coupled to a lower surface of the seat pans 30, 32. The seat pans 30, 32 include mounting apertures 38 disposed therethrough which are generally disposed adjacent to rear edges of the seat pans 30, 32, as further described below. The mounting apertures 38 are disposed through recessed portions 39 of the seat pans 30, 32 to provide for a substantially flush appearance when engagement members 112 (FIGS. 8A and 8B) are received in the mounting apertures 38, as further described below.

Figure 2:
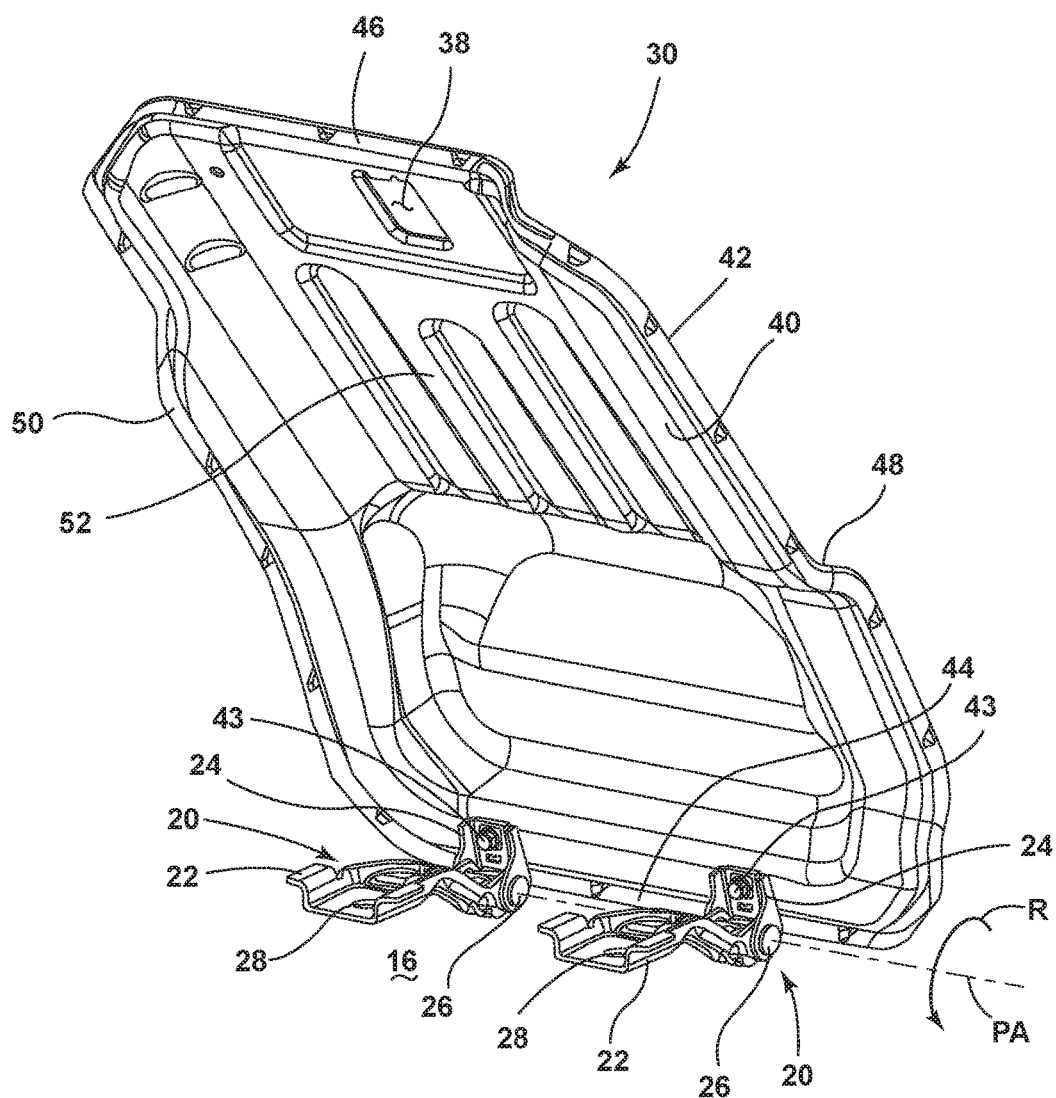
FIG. 2 is a front perspective view of a seat pan of a folding seat assembly having multiple hinge assemblies coupled thereto.

Referring now to FIG. 2, the seat pan 30 of the seat portion 12 is shown having multiple hinge assemblies 20 coupled to a lower surface 40 of the seat pan 30. Specifically, the hinge assemblies 20 are coupled to the lower surface 40 of the seat pan 30 at second arms 24 of the hinge assemblies 20 via fasteners 43. While the image shown in FIG. 2 includes the seat pan 30 of the seat portion 12 shown in FIGS. 1A-1C, it is contemplated that the description of the seat pan 30 will also generally describe the seat pan 32 with regards to the retaining features further described below. The seat pan 30 is shown having the lower surface 40 and an upper surface 42 with front and rear perimeter edge portions 44, 46 and side perimeter edge portions 48, 50. The perimeter edge portions 44, 46, 48 and 50 generally surround a body portion 52 of the seat pan 30 that is contoured for supporting a vehicle occupant. The mounting aperture 38 is disposed through the body portion 52 of the seat pan 30 at recessed portion 39 and disposed adjacent the rear perimeter edge 46. The hinge assemblies 20 are coupled to the underside or lower surface 40 of the seat pan 30 near the front perimeter edge 44 thereof. In this way, the seat pan 30 is configured for forward rotation via the hinge assemblies 20 in a manner as described above with reference to FIGS. 1A-1C. The first arms 22 of the hinge assemblies 20 are coupled to the second arms 24 via hinge pins 26 which generally define the pivoting axis PA along which the seat pan 30 rotates. The second arms 24 are configured to couple to the support surface 16 via fasteners received through mounting apertures 28 of the first arms 22 which fixedly couple the hinge assemblies 20 to the vehicle body at support surface 16. As noted above, the seat pan 30 includes retaining features that are configured to retain a seat portion, such as seat portion 12 described above, in a downwardly folded use position as shown in FIG. 1A. The hinge assemblies 20 and the mounting aperture 38 of the seat pan 30 are configured to receive retaining features which are configured to retain the seat portion 12 in a use position, yet easily allow for a user to move the seat portion 12 to the upright stowed position shown in FIGS. 1B and 1C. Thus, the retaining features described below are configured to retain the seat portion 12 from unexpected or undesired movement when the seat portion 12 is unoccupied, yet the retention features are designed to allow a user to easily move the seat portion 12 from the use position to the upright stowed position. The retaining features of the folding seat assembly 10 will now be described.

Figure 3:
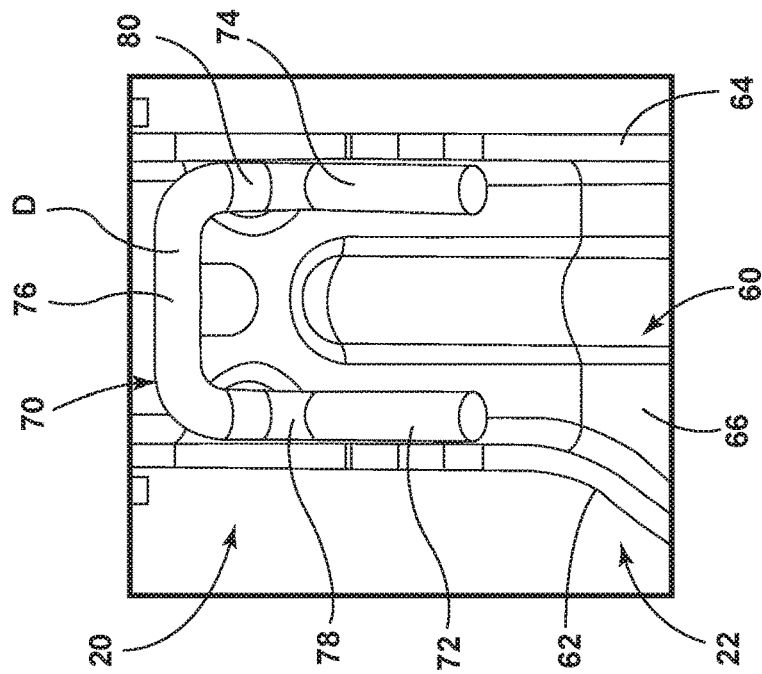
FIG. 3 is a top perspective view of a first arm of a hinge assembly having an engagement feature disposed thereon.

Referring now to FIG. 3, a portion of the first arm 22 of a hinge assembly 20 is shown having a body portion 60. The body portion 60 is generally defined by first and second side members 62, 64 which are interconnected by a central planar intermediate portion 66 to define a generally U-shaped cross-section of the first arm 22 of the hinge assembly 20. As further shown in FIG. 3, an engagement feature 70 is shown coupled to the body portion 60 of the first arm 22. The engagement feature 70 includes first and second legs 72, 74 which are interconnected by an intermediate portion 76. The engagement feature 70 includes angled portions 78, 80 disposed between the first and second legs 72, 74 and the intermediate portion 76, such that the intermediate portion 76 extends upwardly and outwardly from the body portion 60 of the first arm 22 of the hinge assembly 20. In this way, the engagement feature 70 provides for an engaging portion, via the intermediate portion 76, that outwardly extends from the first arm 22 of the hinge assembly 20. In the embodiment shown in FIG. 3, the first and second legs 72, 74 of the engagement feature 70 are shown coupled to the first and second side members 62, 64 of the body portion 60 of the first arm 22. It is further contemplated that any arrangement for the first and second legs 72, 74 of the engagement feature 70 can be used to couple the engagement feature 70 to the body portion 60 of the first arm 22. Further, any arrangement, such as a plate, may be used to couple the engagement feature 70 to the body portion 60 of the first arm 22. In the embodiment shown in FIG. 3, the engagement feature 70 is shown in the form of a retaining bar that is constructed from a bent wire made of a metallic material, such as steel. Other materials may be contemplated for use with the present invention, and in the case of a metallic engagement feature, the engagement feature 70 can be welded to the first arm 22 of the hinge assembly 20 which is also contemplated to be comprised of a steel stamped product. In the embodiment shown in FIG. 3, the engagement feature 70 is contemplated to have a consistent diameter D throughout as specifically indicated at intermediate portion 76.

Figure 4:
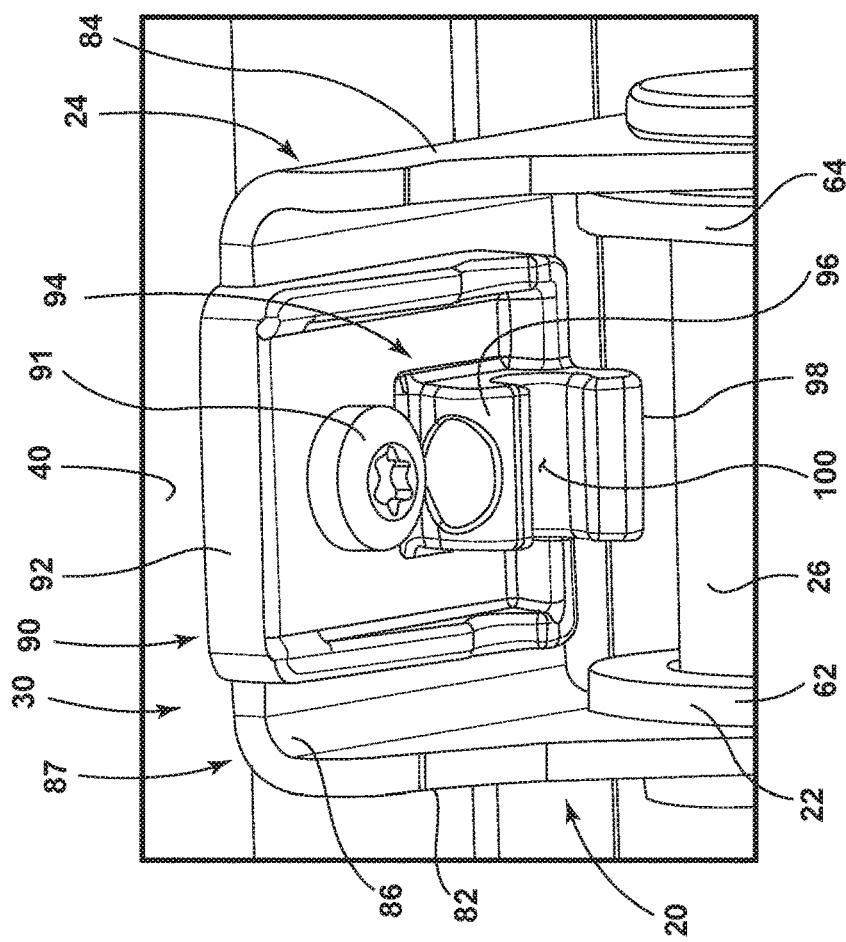
FIG. 4 is a top perspective view of a second arm of a hinge assembly having an engagement feature disposed thereon.

Referring now to FIG. 4, the second arm 24 of the hinge assembly 20 is shown coupled to the lower surface 40 of seat pan 30. The second arm 24 includes first and second side members 82, 84 which are interconnected by a generally central planar intermediate portion 86. Together, the side members 82, 84 and intermediate portion 86 define a body portion 87 of the second arm 24. As further shown in FIG. 4, end portions of the side members 62, 64 of the first arm 22 are connected with end portions of the side members 82, 84 of the second arm 24 via a hinge pin 26, such that the first and second arms 22, 24 are hingedly coupled to one another and operable between open and closed positions relative to one another. As further shown in FIG. 4, an engagement feature 90 is coupled to the body portion 87 of the second arm 24 at the intermediate planar portion 86 thereof via a fastener 91, which is contemplated to couple the engagement feature 90 to the second arm 24, as well as couple the second arm 24 to the lower surface 40 of the seat pan 30. The engagement feature 90 is contemplated to be a polymeric part that can be formed using an injection molding process or other like polymeric forming technique. The engagement feature 90 includes a base portion 92 through which fastener 91 is disposed. The engagement feature 90 further includes a clip member 94 extending outwardly therefrom. The clip member 94 includes first and second resilient members 96, 98 which extend outwardly from the base portion 92. As shown in FIG. 4, the first and second resilient members 96, 98 of the clip member 94 are generally spaced-apart to define a receiving recess 100 disposed therebetween. The resilient members 96, 98 are contemplated to be flexibly resilient given there generally polymeric makeup. In this way, the engagement feature 70 of the first arm 22 can be received in the outwardly opening clip member 94 in the receiving recess 100 defined between the first and second resilient members 96, 98. Specifically, the intermediate portion 76 of the engagement feature 70 of the first arm 22 is contemplated to be received in the receiving recess 100 of the clip member 94 as further described below. Thus, the receiving recess 100 includes a spacing that correlates to the diameter D of the engagement feature 70 of the first arm 22.

Figure 5A:
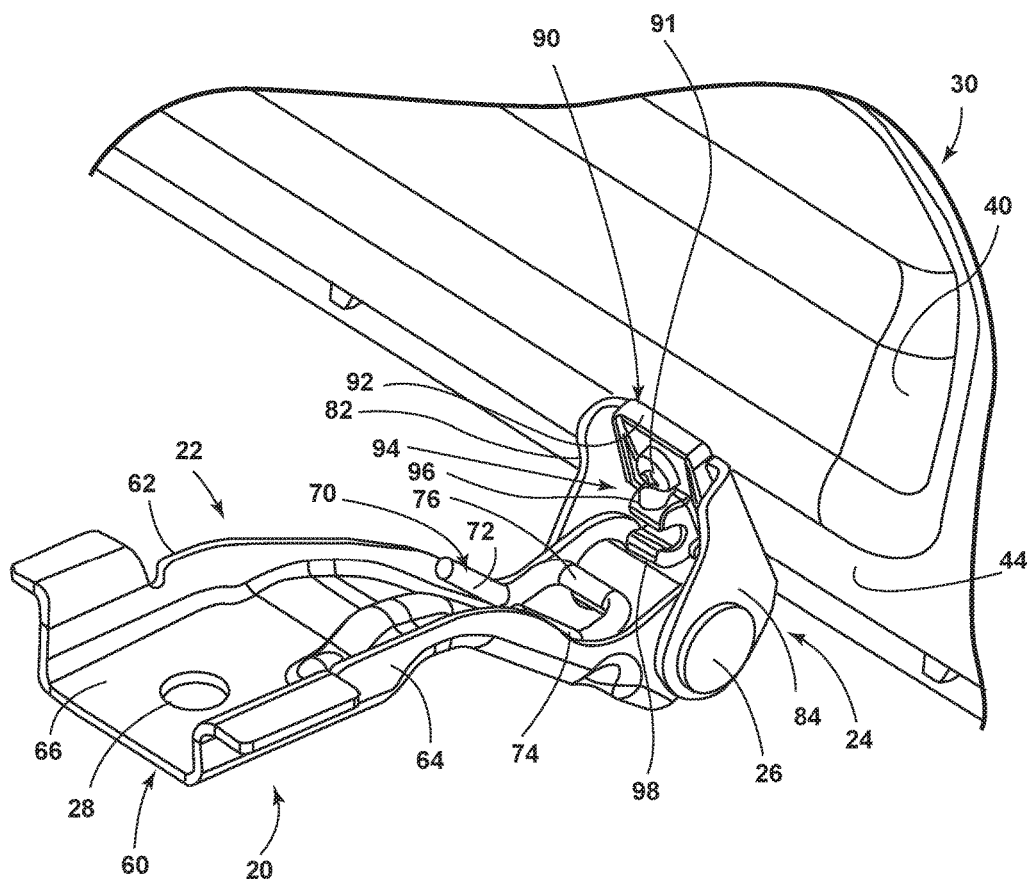
FIG. 5A is a top perspective view of the hinge assembly of FIGS. 3 and 4 in an open position with the engagement features of FIGS. 3 and 4 shown in a disengaged position.

Referring now to FIG. 5A, a hinge assembly 20 is shown with the engagement feature 70 coupled to the first arm 22 and the engagement feature 90 shown coupled to the second arm 24. As oriented within a vehicle, the first and second arms 22, 24 may be referred to as upper and lower arms or brackets which are hingedly coupled to one another via hinge pin 26 between open and closed positions. In the embodiment shown in FIG. 5A, the hinge assembly 20 is shown in an open position with engagement features 70, 90 being spaced-apart disengaged from one another. As the seat pan 30 rotates downwardly towards the use position (shown in FIG. 1A), the engagement feature 90 approaches the engagement feature 70 as the hinge assembly 20 moves from the open position shown in FIG. 5A towards the closed position, which is shown and described below with regards to FIG. 6.

Thus, as shown in FIG. 5A, the hinge assembly 20 is in an open position as the seat pan is in an upright stowed position correlating to a seat portion 12 (FIG. 1B) being in an upright stowed position. When the seat pan 30 is rotated downward in a direction as indicated by arrow R along the pivot access PA of the hinge assembly 20, the engagement feature 90 of the second arm 24 approaches the engagement feature 70 of the first arm 22 of the hinge assembly 20 until the engagement feature 70 of the first arm 22 is received in the receiving recess 100 of the engagement feature 90 of the second arm 24. In this way, the second arm 24 is a moveable upper arm that moves with the seat pan 30 as coupled to a lower surface 40 thereof. The first arm 22 is contemplated to be fixedly coupled to a support surface, such as support surface 16 shown in FIG. 1C, that remains stationary during the movement of the seat pan 30. Thus, as the seat pan 30 moves between use and upright stowed positions, the hinge assembly 20 moves between closed and open positions, respectively.

Figure 5B:
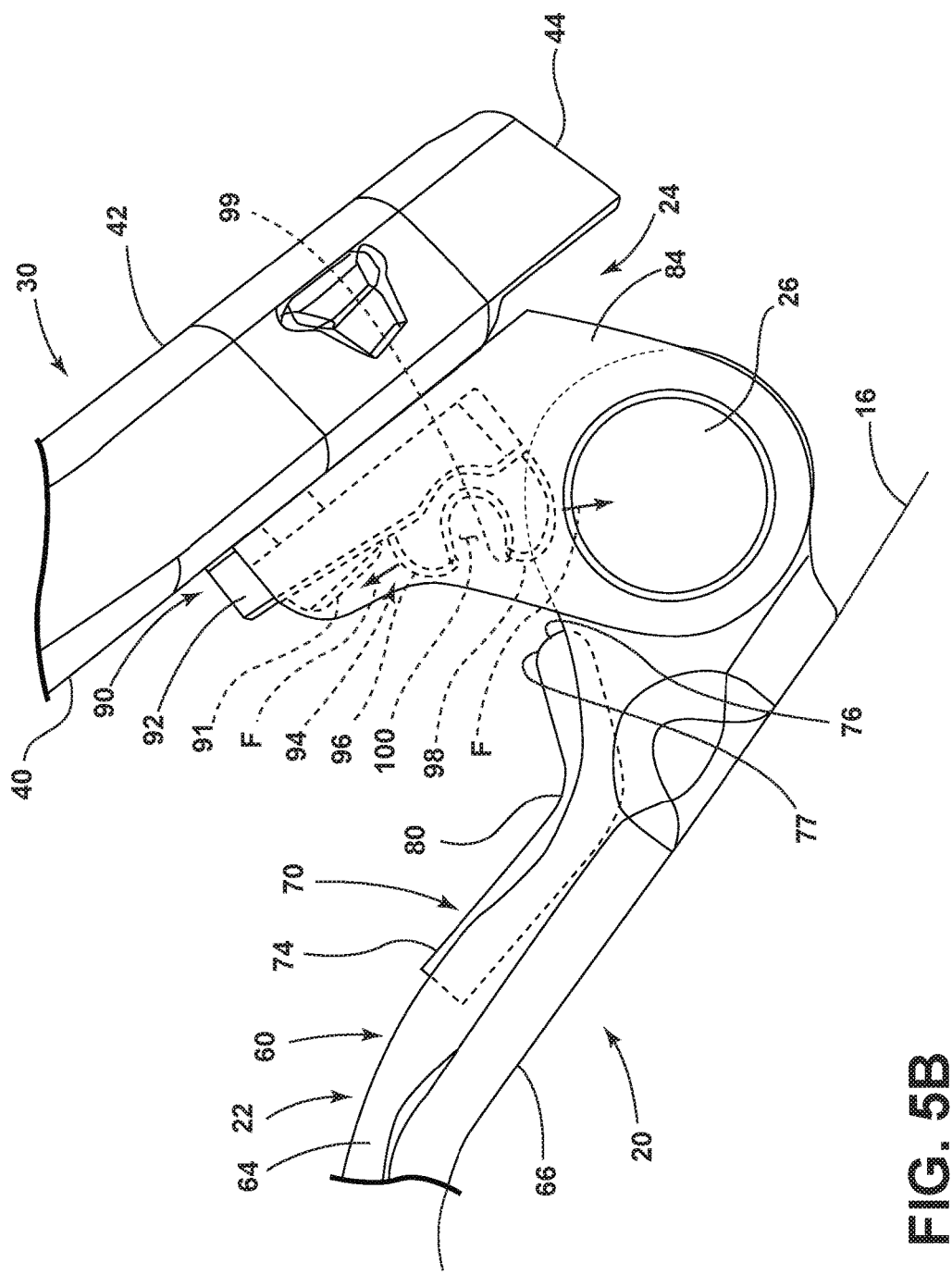
FIG. 5B is a side elevational view of the hinge assembly and engagement features of FIG. 5A shown in a disengaged position.

Referring now to FIG. 5B, the hinge assembly 20 is again shown in an open position with the engagement features 70, 90 of the first and second arms 22, 24 being disengaged from one another. The engagement features 70, 90 are partially shown in phantom as they are relatively concealed by the outwardly extending side members 64, 84 of the first and second arms 22, 24 of the hinge assembly 20. Thus, the retaining features of the hinge assembly 20 are fully integrated into the hinge assembly 20, thereby providing a simple retaining solution for the seat pan 30. As noted above, the first and second resilient members 96, 98 of the clip member 94 are flexibly resilient to outwardly flex in the direction as indicated by arrow F during the engagement of the intermediate portion 76 of engagement feature 70 of the first arm 22. The rounded outer surface 77 of the intermediate portion 76 of the engagement feature 70 provides for a smooth contour for being received within the receiving recess 100 disposed between the first and second resilient members 96, 98. Further, the clip member 94 includes rounded outer surfaces 99 on the first and second resilient members 96, 98, such that the intermediate portion 76 of engagement feature 70 is easily received in the receiving recess 100. The curved outer surface 77 of the engagement feature 70 also facilitates a seamless urging of the first and second members 96, 98 to their outwardly flexed positions to widen the receiving recess 100 for full reception of the intermediate portion 76 of the engagement feature 70. When the intermediate portion 76 of the engagement feature 70 is fully received in the receiving recess 100 of the engagement feature 90, the first and second resilient members 96, 98 will resiliently snapback to an at-rest position from an outwardly flexed position to retain the intermediate portion 76 of the engagement feature 70 of the first arm 22 within the receiving recess 100 of the engagement feature 90 of the second arm 24. Flexing of the resilient members 96, 98 is contemplated to be a minimal movement given their semi-rigid polymeric composition. The receiving of the intermediate portion 76 within the receiving recess 100 of the clip member 94 is contemplated to provide tactile feedback to a user that the seat pan 30 has been retained by the interaction of the engagement features 70, 90 of the hinge assembly 20.

Figure 6:
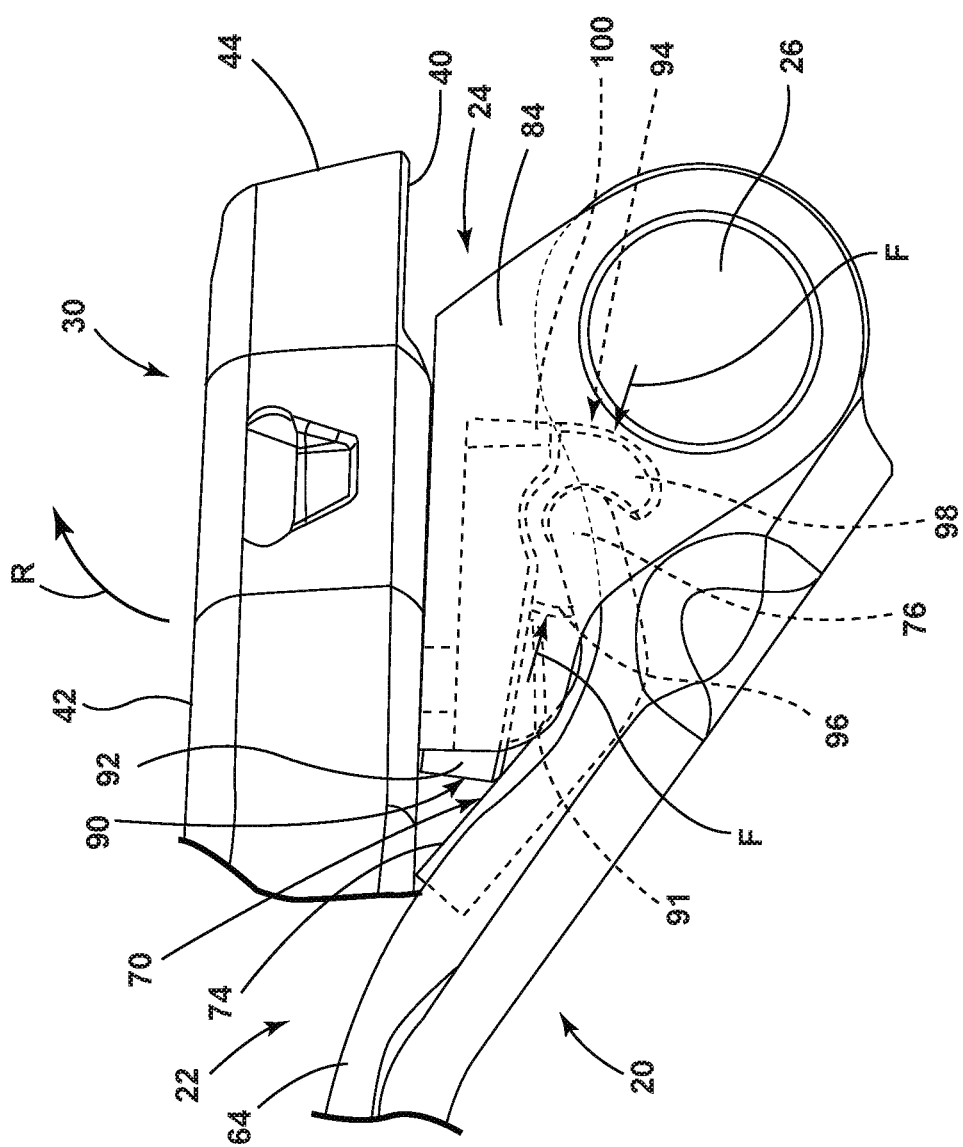
FIG. 6 is a side elevational view of the hinge assembly of FIG. 5B with the engagement features shown in an engaged position.

Referring now to FIG. 6, the hinge assembly 20 is shown in a closed position, with the seat pan 30 in the folded down use position. With the seat pan 30 in the folded down use position, the engagement feature 90 of the second arm 24 has been brought into contact and engagement with the engagement feature 70 of the fixed first arm 22, such that the intermediate portion 76 of the engagement feature 70 of the first arm 22 has been received in the receiving recess 100 of the clip member 94 of the engagement feature 90 of the second arm 24. Thus, it is contemplated that the first and second resilient members 96, 98 have resiliently snapped back to their at-rest position from an outwardly flexed position in the direction as indicated by arrow F in FIG. 6. With the hinge assembly 20 disposed along a front perimeter edge 44 of the seat pan 30, the interconnection of the engagement features 70, 90 of the hinge assembly 20 will help retain the seat pan 30 in a downward use position when forces may urge the seat pan 30 in an upward rotation direction towards the stowed position as indicated by arrow R. Thus, the multiple hinge assemblies 20 of the present concept are contemplated to be spaced-apart along the front perimeter edge 44 of the seat pan 30 and it is contemplated that the multiple hinge assemblies 20, such as shown in FIGS. 1C and 2, may all include the engagement features 70, 90 disposed on the first and second arms 22, 24, respectively, thereof. Further, it is contemplated that one set of engagement features 70, 90 on a single hinge assembly 20, may be all that is necessary to retain the seat pan 30 in the downward use position, such that a dual hinge assembly, such as shown in FIG. 2, may include the engagement features 70, 90 on a single hinge assembly 20 while the other hinge assembly 20 does not include any engagement features. While the intermediate portion 76 of the engagement feature 70 is shown retained within the clip member 94 of the engagement feature 90, it is contemplated that this intermediate portion 76 is releasably retained in the clip member 94 of the engagement feature 90 of the second arm 24, such that when a user provides an upward rotational force in the direction as indicated by arrow R on the seat pan 30, the clip member 94 will release the intermediate portion 76 of the engagement feature 70 from the receiving recess 100 of the clip member 94. In this way, the intermediate portion 76 of the engagement feature 70 of the first arm 22 of the hinge assembly 20 is releasably retained in the engagement feature 90 of the second arm 24 of the hinge assembly 20. Further, it will be appreciated by one of ordinary skill in the art that the engagement features 70, 90 of the first and second arms 22, 24 may also be interchanged, such that the engagement feature 90 is disposed on the first arm 22 and the engagement feature 70 is disposed on the second arm 24 of the hinge assembly 20. The configuration of the engagement features 70, 90 is not critical to the retaining of the seat pan 30 as used with the hinge assembly 20, so long as the engagement features 70, 90 are disposed on opposite arms 22, 24 of the hinge assembly for releasably connecting one engagement feature to the other.

Figure 7:
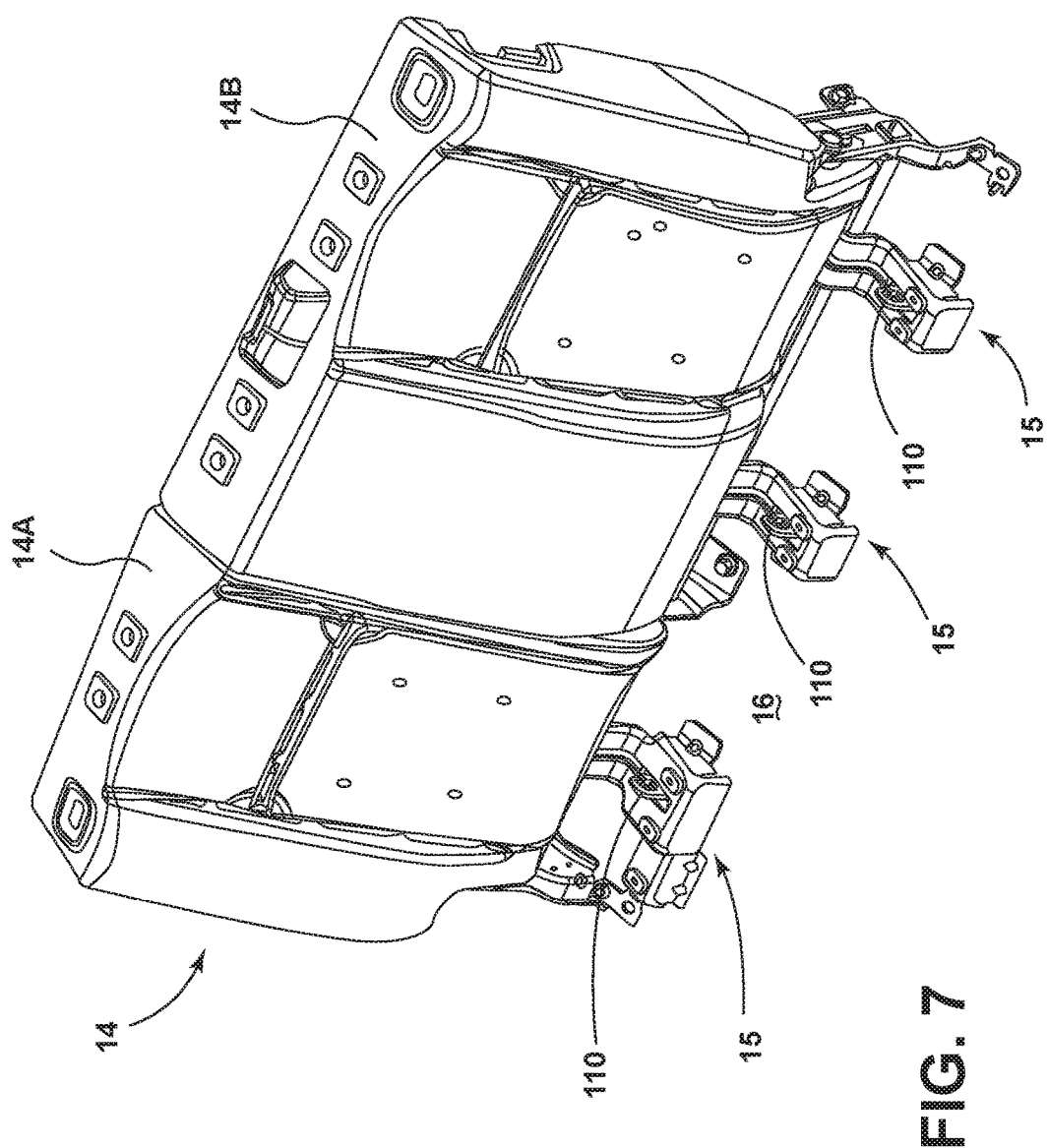
FIG. 7 is a front perspective view of a seatback assembly supported on a support surface by multiple brackets having upwardly extending engagement features.

Referring now to FIG. 7, the seatback 14 is shown having the multiple brackets 15 coupled thereto, wherein the multiple brackets 15 are further coupled to the support surface 16 which may include a vehicle body or floorboard. As shown in FIG. 7, each one of the brackets 15 of the seatback 14 includes an engagement feature 110 which upwardly extends from the bracket 15. Thus, with the brackets 15 coupled to the support surface 16, the engagement features 110 upwardly extend from the support surface 16 and are fixedly coupled thereto. The engagement features 110 of the seatback 14 are used to further retain the seat pan 30 in a downwardly folded use position, such as the configuration of the seat portion 12 shown in FIG. 1A. In the embodiment shown in FIG. 7, the engagement features 110 are shown in the form of hook members which may be formed from a bar having a rounded outer surface, as further described below.

Figure 8A:
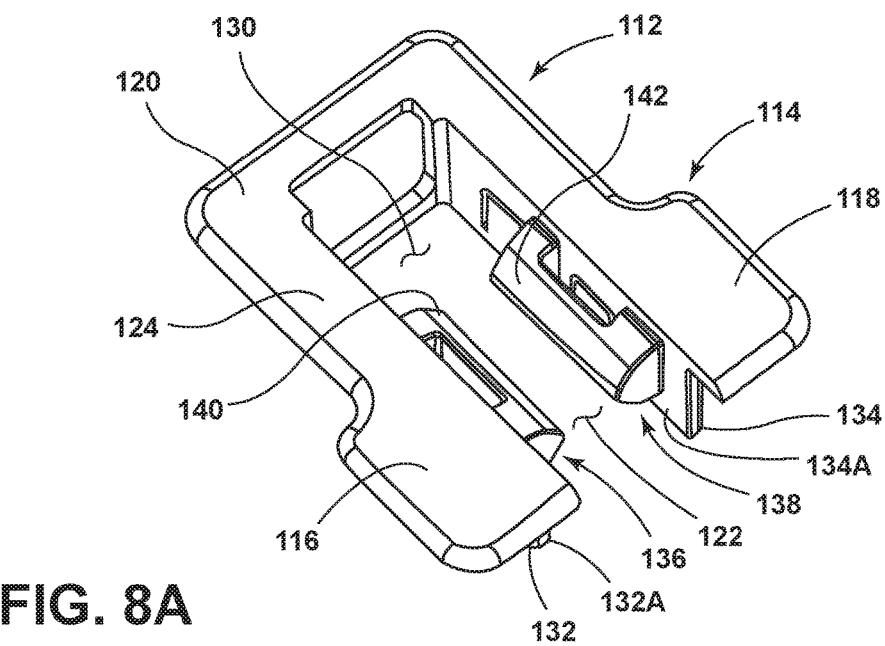
FIG. 8A is a top perspective view of an engagement member having a receive aperture with first and second tabs extending inwardly into the receiving aperture.
Figure 8B:
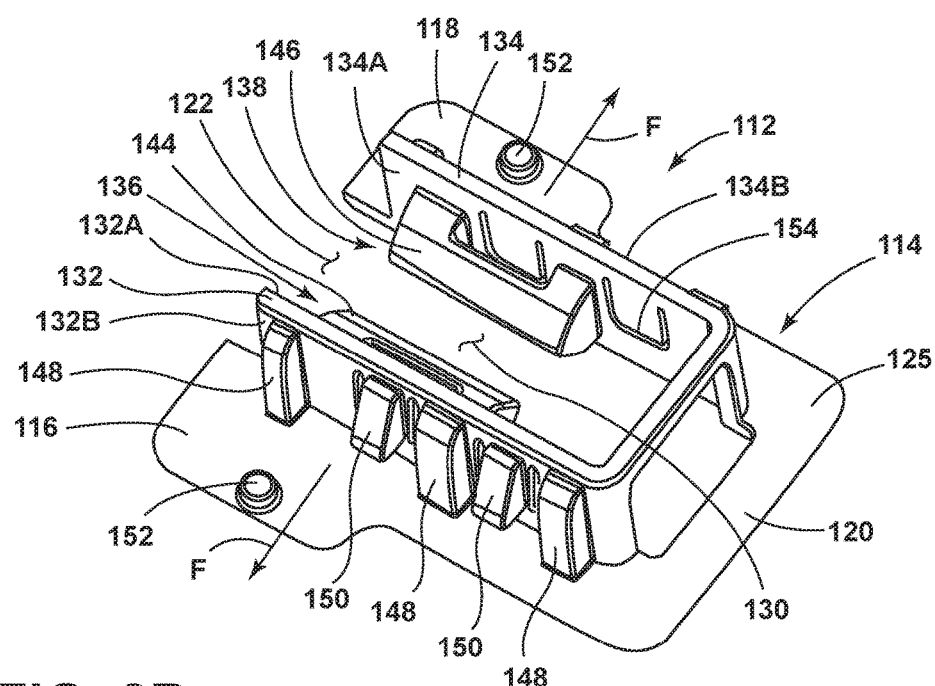
FIG. 8B is a bottom perspective view of the engagement member of FIG. 8A.

Referring now to FIGS. 8A and 8B, an engagement member 112 is shown which is configured to be coupled to the seat pan 30 at the mounting aperture 38 thereof. In the configuration of the folding seat assembly 10 shown in FIG. 1C, it is contemplated that an engagement member 112, as shown in FIGS. 8A and 8B, would be received in the mounting apertures 38 disposed through the seat pans 30, 32, such that a folding seat assembly, such as folding seat assembly 10, may include multiple engagement members 112 to be used in conjunction with them multiple engagement features 110 of the seatback 14.

With specific reference to FIG. 8A, the engagement member 112 includes a frame portion 114 which is generally defined by first and second side members 116, 118 which are interconnected by a rear cross member 120. In this way, the frame portion 114 is a non-continuous frame portion having a relief portion 122 disposed between the first and second side members 116, 118. The frame portion 114 includes an outer surface 124, and the frame portion 114 generally defines a receiving aperture 130 disposed between the first and second side members 116, 118. As further shown in FIG. 8A, the engagement member 112 further includes first and second sidewalls 132, 134 which outwardly extend from the frame portion 114. Each of the sidewalls 132, 134 includes an inwardly extending tab 136, 138, respectively. Specifically, the tabs 136, 138 define first and second opposed tabs which inwardly extend into the receiving aperture 130 of the engagement member 112 by extending laterally from inner surfaces 132A, 134A of the first and second sidewalls 132, 134 into the receiving aperture 130. As shown in FIG. 8A, the first and second tabs 136, 138 include upwardly angled lower surfaces 140, 142, respectively. The first and second tabs 136, 138 also include downwardly angled upper surfaces 144, 146, respectively, as best shown in FIG. 8B. With the angled surfaces 140, 142, 144, 146, the first and second tabs 136, 138 are configured to urge the sidewalls 132, 134 towards outwardly flexed positions as indicated by arrows F as an engagement feature, such as engagement feature 110 shown in FIG. 7, is received in the receiving aperture 130 of the engagement member 112. In this way, the first and second sidewalls 132, 134 are contemplated to be flexibly resilient for movement between at-rest and outwardly flexed positions when the engagement feature 110 is received in the receiving aperture 130.

With specific reference to FIG. 8B, the first and second sidewalls 132, 134 further include outer surfaces 132B, 134B having one or more reinforcement ribs 148 disposed thereon, as well as one or more clip features 150. In assembly, the clip features 150 are used to clip and retain the engagement member 112 to the mounting aperture 38 of an associated seat pan, such as seat pan 30 or 32 described above. As further shown in FIG. 8B, the frame portion 114 of the engagement member 112 includes an inner surface 125 having standoff features 152 disposed on the first and second side members 116, 118 to provide a snug-fit of the engagement member 112 with the seat pan 30. Further, the first and second sidewalls 132, 134 include relief channels 154 which are disposed around the clip features 150 of the first and second sidewalls 132, 134. In this way, the clip features 150 can inwardly flex as the engagement member 112 is received in the mounting aperture 38 of a seat pan 30.

Figure 9:
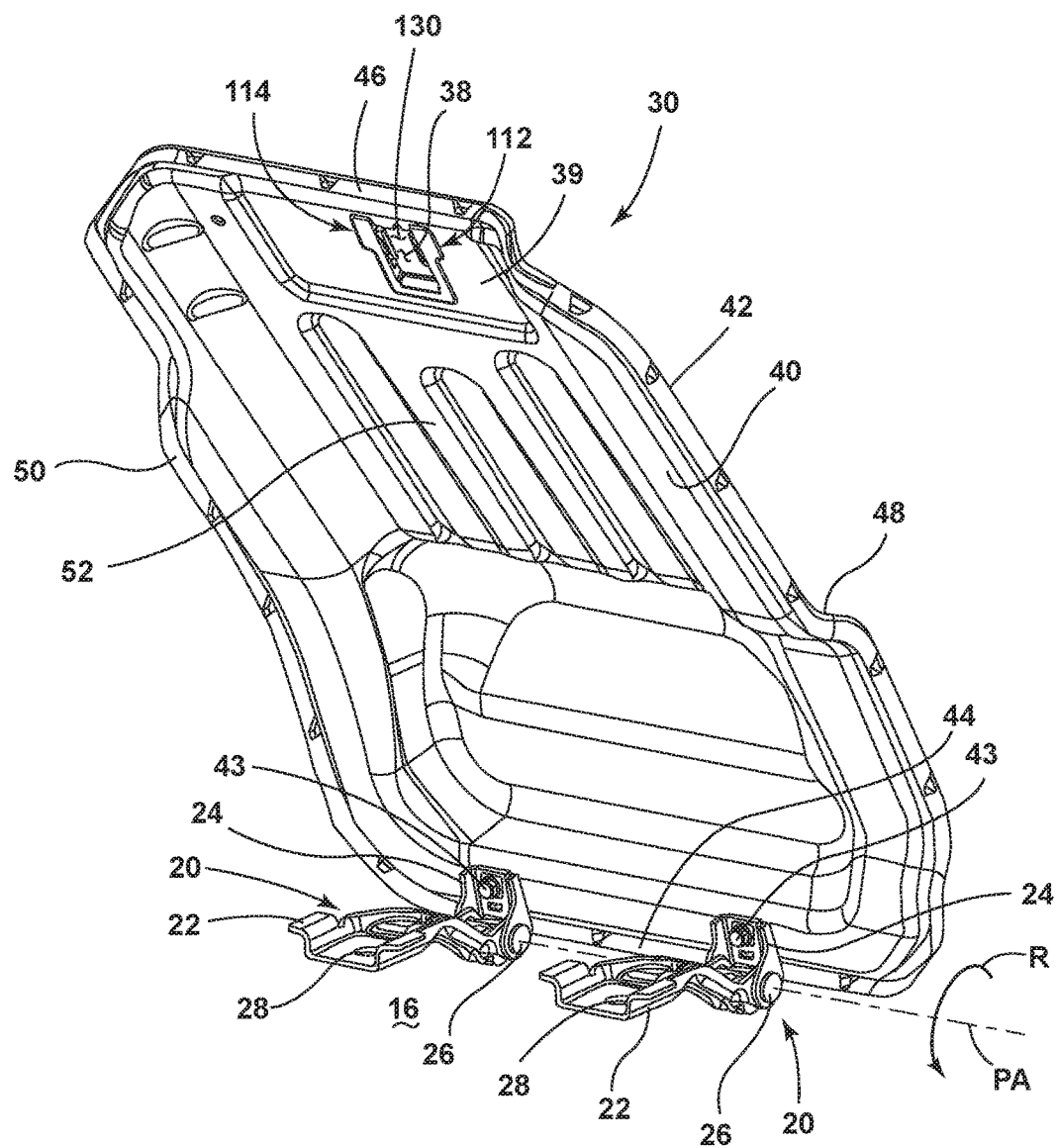
FIG. 9 is a front perspective view of the seat pan of FIG. 2 with the engagement member of FIG. 8A disposed in a mounting aperture of the seat pan.

Referring now to FIG. 9, the seat pan 30 is shown with the engagement member 112 mounted to the mounting aperture 38 of the seat pan 30. With the engagement member 112 coupled to the seat pan 30 at mounting aperture 38, the inner surface 125 of the frame portion 114 of the engagement member 112 abuts the lower surface 40 of the seat pan 30. Specifically, the frame portion 114 of the engagement member 112 is disposed within the recessed portion 39 of the seat pan 30, such that the engagement member 112 is substantially flush with the lower surface 40 of the seat pan 30. As further shown in FIG. 9, the receiving aperture 130 of the engagement member 112 is aligned with the mounting aperture 38 of the seat pan 30, such that an engagement feature, such as engagement feature 110 described above, can be received through the seat pan 30 to engage first and second tabs 136, 138 (FIG. 8A) of the engagement member 112.

Figure 10:
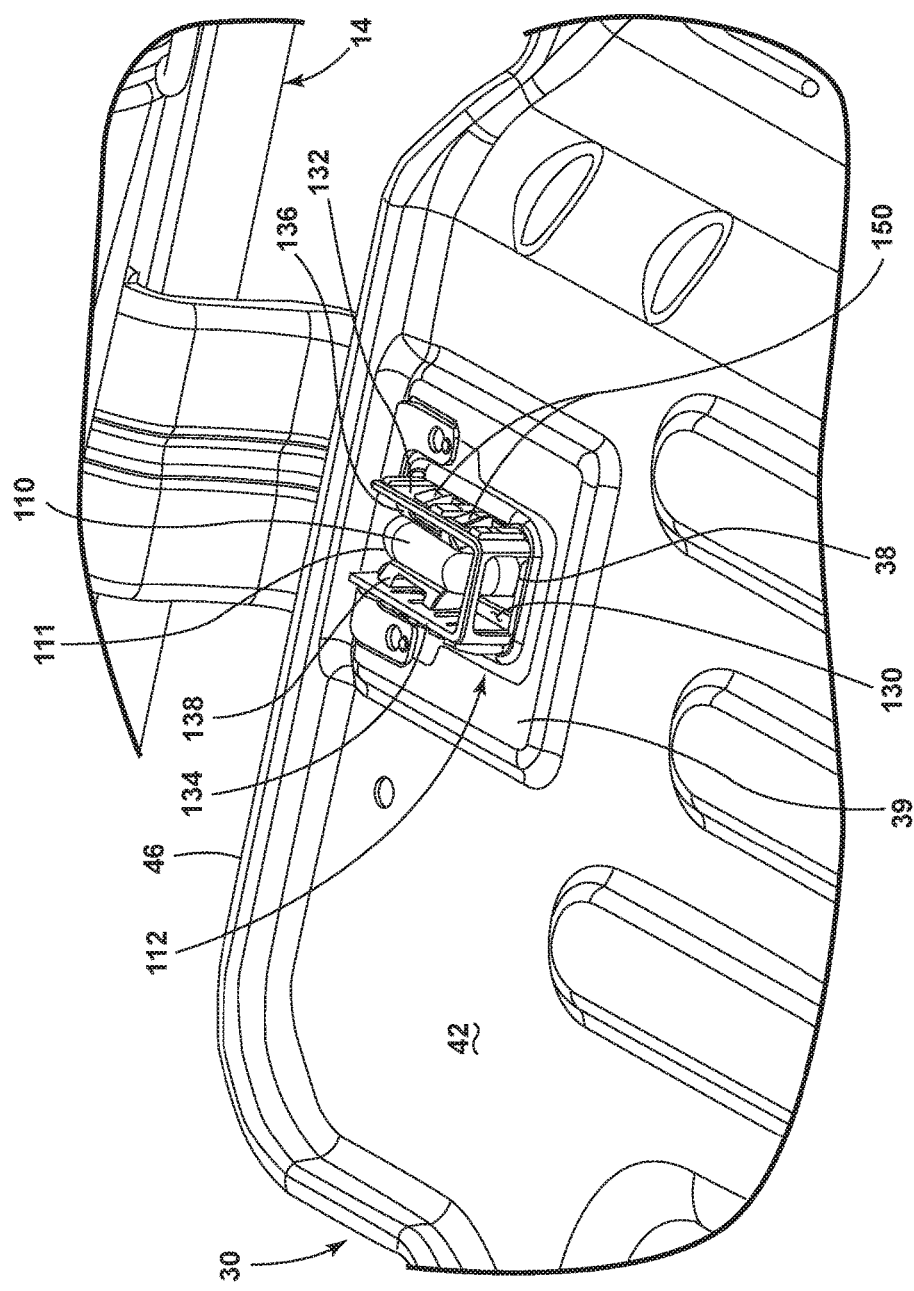
FIG. 10 is a top perspective view of an engagement feature of FIG. 7 received in the engagement member of FIG. 9 as mounted to the mounting aperture of the seat pan.

Referring now to FIG. 10, the seat pan 30 is shown from a top perspective view with the cushion material removed from the upper surface 42. With the cushion material removed from the upper surface 42, the engagement member 112 can be seen extending through the mounting aperture 38 of the seat pan 30. Specifically, the first and second sidewalls 132, 134 are shown extending upwardly through the mounting aperture 38 of the seat pan 30, and retained in this position by the clip features 150 engaging the perimeter portions of the mounting aperture 38. As further shown in FIG. 10, the engagement feature 110 is shown received in the receiving aperture 130 disposed between the first and second sidewalls 132, 134 of the engagement member 112. With the engagement feature 110 clipped to the engagement member 112, the seat pan 30 is generally retained in a folded down use position by the interaction between the engagement feature 110 being received in the receiving aperture 130 of the engagement member 112. Specifically, the engagement feature 110 is retained by the inwardly extending tabs 136, 138 when the seat pan 30 is in the downwardly folded use position. This engagement is contemplated to be a releasable engagement between the engagement feature 110 and the engagement member 112, such that a user may release the engagement of the engagement feature 110 from the engagement member 112 by providing an upward force on the seat pan 30 to move the seat pan 30 from the use position (FIG. 1A) to the upright stowed position (FIG. 1B).

Figure 11:
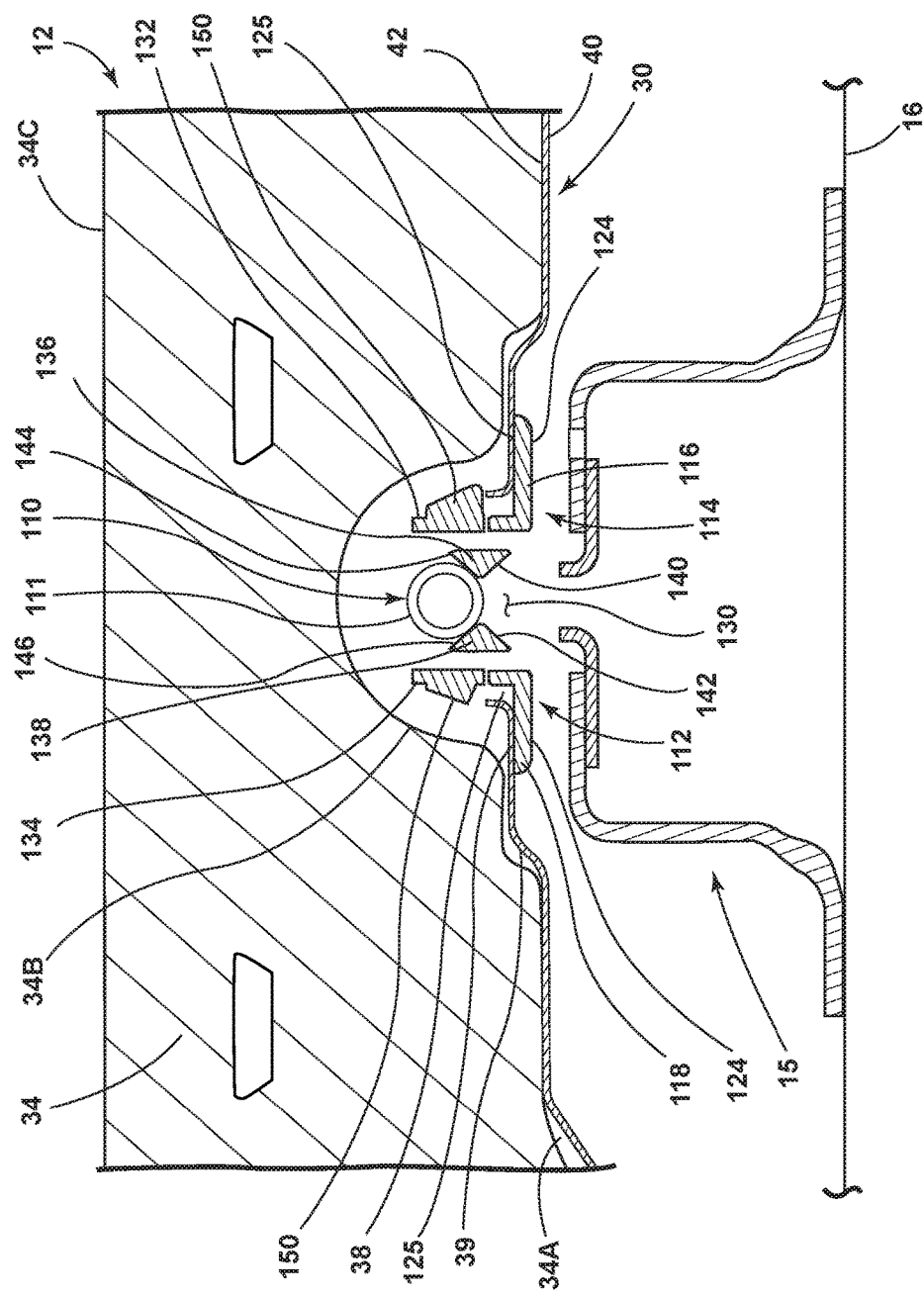
FIG. 11 is a cross-sectional view of FIG. 1A taken at line XI showing the engagement feature of FIG. 10 received in a receiving aperture of the engagement member of FIG. 10.

Referring now to FIG. 11, a cross-sectional view of the seat portion 12 shows the interaction between the engagement features 110 and the engagement member 112 with the seat portion 12 in the use position. As specifically shown in FIG. 11, the seat pan 30 is in the downwardly folded use position, such that the engagement feature 110 is received and retained within the receiving aperture 130 of the engagement member 112. The curved outer surface 111 of the engagement feature 110 is shown engaged with upper angled surfaces 144, 146 of the first and second tabs 136, 138 of the engagement member 112. The frame portion 114 of the engagement member 112 is shown seated within the recessed portion 39 of the seat pan 30, such that the engagement member 112 provides for a generally flush configuration relative to the lower surface 40 of the seat pan 30. As further shown in FIG. 11, the seat pan 30 includes a cushioned portion 34 coupled to the upper surface 42 thereof. The cushioned portion 34 includes a lower surface 34A and an upper surface 34C. The upper surface 34C is contemplated to support a vehicle occupant on the seat portion 12 when the seat portion 12 is in the use position. As further shown in FIG. 11, the cushioned member 34 includes a recess 34B disposed over the mounting aperture 38 of the seat pan 30 in assembly. In this way, the portion of the engagement member 112 extending through the mounting aperture 38 of the seat pan 30 is received in the recess 34B of the cushion member 34, such that the cushion member 34 does not interfere with the interaction of the engagement member 112 and engagement feature 110.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A hinge assembly, comprising:
   a first arm;
   a second arm pivotally coupled to the first arm by a pivot pin defining a pivot axis, wherein the second arm pivots with respect to the first arm along the pivot axis between an open position and a closed position; an engagement feature disposed on the first arm and outwardly spaced-apart from the pivot axis; and
   a clip member disposed on the second arm and having a first resilient member and a second resilient member extending outwardly from the second arm, wherein the engagement feature of the first arm is received and releasably retained in a receiving recess defined between the first resilient member and the second resilient member of the clip member of the second arm when the first arm and the second arm are in the closed position.

2. The hinge assembly of claim 1, wherein the engagement feature of the first arm is released from the clip member of the second arm when the second arm pivots from the closed position towards the open position.

3. The hinge assembly of claim 1, wherein the engagement feature of the first arm includes a retaining bar.

4. The hinge assembly of claim 3, wherein the clip member includes a base portion mounted to a body portion of the second arm.

5. The hinge assembly of claim 4, wherein the first resilient member and the second resilient member extend outwardly from the base portion.

6. A hinge assembly, comprising:
   a first arm having a retaining bar;
   a second arm pivotally coupled to the first arm by a pivot pin spaced-apart from the retaining bar, wherein the second arm is operable between an open position and a closed position relative to the first arm; and
   a clip member coupled to the second arm for movement therewith, wherein the clip member includes a first resilient member and a second resilient member, and further wherein the clip member moves towards and releasably receives the retaining bar of the first arm as the second arm moves to the closed position from the open position.

7. The hinge assembly of claim 6, wherein the second arm includes a body portion having a planar portion.

8. The hinge assembly of claim 7, wherein the clip member is disposed on a base portion mounted to the planar portion of the second arm.

9. The hinge assembly of claim 8, wherein the first resilient member and the second resilient member extend outwardly from the base portion.

10. The hinge assembly of claim 9, including:
    a receiving recess defined between the first and second resilient members, wherein the first and second resilient members are operable between at-rest and outwardly flexed positions, and further wherein the receiving recess is larger when the first and second resilient members are in the outwardly flexed position as compared to when the first and second resilient members are in the at-rest position.

11. The hinge assembly of claim 10, wherein the first arm includes a body portion having a generally planar central portion with outwardly extending side members disposed on opposite sides thereof.

12. The hinge assembly of claim 11, wherein the retaining bar includes a first leg and a second leg interconnected by an intermediate portion, wherein the first leg and the second leg are coupled to the outwardly extending side members of the first arm.

13. A hinge assembly for a folding vehicle seat, comprising:
- an upper arm and a lower arm pivotally coupled to one another between an open position and a closed position, wherein the lower arm is fixedly coupled to a support surface, and further wherein the upper arm is fixedly coupled to a seat pan, and further wherein the seat pan is operable between a stowed position and a use position, and further wherein the seat pan is in the use position when the upper arm and the lower arm are in the closed position;
- a retaining bar disposed on the lower arm and outwardly extending therefrom; and
- an outwardly opening clip member disposed on the upper arm, wherein the clip member includes a first resilient member and a second resilient member which cooperate to releasably receive a portion of the retaining bar of the lower arm when the upper arm and the lower arm are in the closed position, and further wherein the upper arm and the lower arm each include a body portion having a central portion with upwardly extending side members disposed on opposite sides thereof, and further wherein the upper arm and the lower arm are pivotally coupled to one another at the upwardly extending side members by a hinge pin, and further wherein the retaining bar is disposed on the central portion of the lower arm, and the clip member is disposed on the central portion of the upper arm.

14. The hinge assembly of claim 13, wherein the support surface includes a vehicle body.

15. The hinge assembly of claim 14, wherein the upper arm is coupled to a lower surface of the seat pan at a front portion thereof.

16. The hinge assembly of claim 13, wherein the seat pan is releasably retained in the use position by an interconnection between the retaining bar and clip member when the upper arm and the lower arm are in the closed position.

* * * * *